US011111001B2

(12) United States Patent
Shaw

(10) Patent No.: US 11,111,001 B2
(45) Date of Patent: Sep. 7, 2021

(54) PROPELLER

(71) Applicant: Superprop Limited, York (GB)

(72) Inventor: Christopher Shaw, Yorkshire (GB)

(73) Assignee: SUPERPROP LIMITED, Yorkshire (GB)

( * ) Notice: Subject to any disclaimer, the term of this patent is extended or adjusted under 35 U.S.C. 154(b) by 0 days.

(21) Appl. No.: 16/750,443

(22) Filed: Jan. 23, 2020

(65) Prior Publication Data

US 2020/0156748 A1    May 21, 2020

Related U.S. Application Data

(62) Division of application No. 15/507,939, filed as application No. PCT/GB2015/052526 on Sep. 2, 2015, now Pat. No. 10,569,850.

(30) Foreign Application Priority Data

Sep. 2, 2014   (GB) ...................................... 1415491

(51) Int. Cl.
| B63H 1/22 | (2006.01) |
| C23F 13/18 | (2006.01) |
| B63H 1/24 | (2006.01) |
| C23F 13/06 | (2006.01) |
| B64C 11/28 | (2006.01) |

(52) U.S. Cl.
CPC ................. *B63H 1/22* (2013.01); *B63H 1/24* (2013.01); *B64C 11/28* (2013.01); *C23F 13/06* (2013.01); *C23F 13/18* (2013.01); *C23F 2213/31* (2013.01)

(58) Field of Classification Search
CPC .............. B63H 1/22; B63H 1/24; B64C 11/28
See application file for complete search history.

(56) References Cited

U.S. PATENT DOCUMENTS

| 725,097 | A | * | 4/1903 | Learnard | ................... | B63H 1/24 |
| | | | | | | 416/142 |
| 866,369 | A | * | 9/1907 | Learnard | ................... | B63H 1/24 |
| | | | | | | 416/142 |

(Continued)

FOREIGN PATENT DOCUMENTS

| WO | WO 93/01973 | * | 2/1993 | .............. B63H 1/24 |
| WO | WO 1993/001973 A1 | | 2/1993 | |
| WO | WO 1995/017731 A1 | | 6/1995 | |

*Primary Examiner* — David Hamaoui
*Assistant Examiner* — Andrew J Marien
(74) *Attorney, Agent, or Firm* — Woodard, Emhardt, Henry, Reeves & Wagner, LLP

(57) ABSTRACT

The invention to which this application relates is to a propeller of the type for use in relation to water vessels and which can be moved between an in-use position in which the blades of the propeller extend outwardly to provide a propulsion force when rotated and, a storage position in which the desire is to minimize the effect of the blades as the vessel moves through the water and in which the blades are held substantially in line with the body of the propeller. The location means which allow the blades to be connected to the body are located within the body and thereby minimize the risk of corrosion and thereby increase the life of the propeller whilst also providing a secure fitment of the blades to the body and allowing ease of movement of the blades between in-use and storage positions.

18 Claims, 8 Drawing Sheets

(56) References Cited

U.S. PATENT DOCUMENTS

Figure 1B:
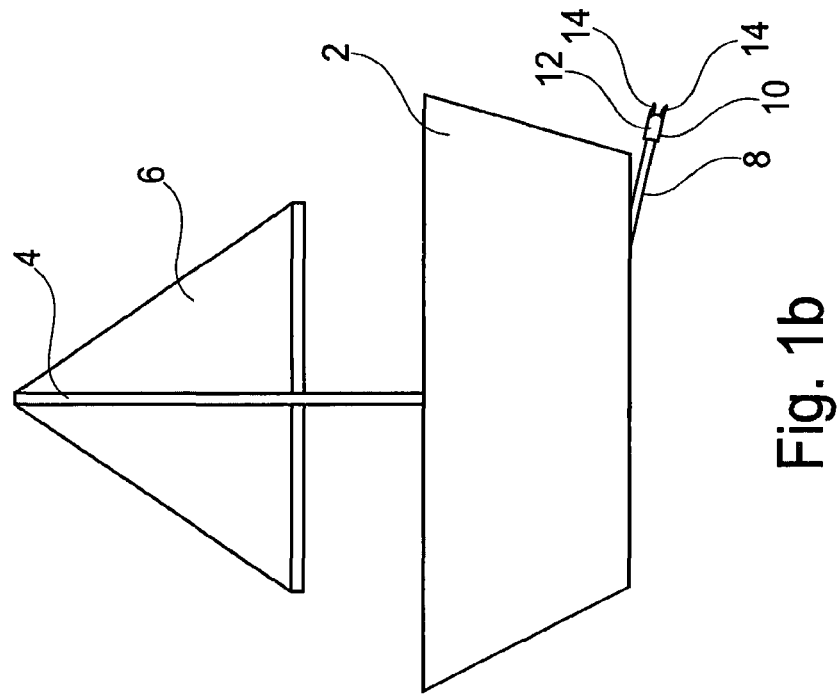

| | | | | |
|---|---|---|---|---|
| 997,828 A * | 7/1911 | Kandera | ............... | F04D 25/088 |
| | | | | 416/142 |
| 997,884 A | 7/1911 | Wells | | |
| 1,802,648 A * | 4/1931 | Heath | ................... | F01D 5/3053 |
| | | | | 416/140 |
| 2,481,751 A * | 9/1949 | James | ..................... | B63H 1/22 |
| | | | | 416/142 |
| 2,500,382 A * | 3/1950 | Rowley | .................. | B64C 11/28 |
| | | | | 416/143 |
| 2,732,021 A | 1/1956 | Taft | | |
| 3,591,311 A | 7/1971 | Butler | | |
| 4,094,614 A * | 6/1978 | Munk | ..................... | B63H 1/24 |
| | | | | 416/140 |
| 4,204,806 A * | 5/1980 | Blanchard | ............... | B63H 1/24 |
| | | | | 416/134 R |
| 4,275,991 A * | 6/1981 | Soderbaum | ............. | B63H 1/24 |
| | | | | 416/134 R |
| 4,391,567 A | 7/1983 | Ciampolillo | | |
| 4,604,068 A * | 8/1986 | Guinn | .................... | C23F 13/02 |
| | | | | 440/76 |
| 4,768,927 A * | 9/1988 | Munk | ..................... | B63H 1/24 |
| | | | | 416/142 |
| 5,573,373 A * | 11/1996 | Olesen | .................... | B63H 1/24 |
| | | | | 416/131 |
| 6,135,835 A * | 10/2000 | Lekhtman | .............. | B63B 34/00 |
| | | | | 441/31 |
| 9,988,132 B1 | 6/2018 | Roberts | | |
| 2016/0272292 A1* | 9/2016 | Skrydstrup | ............. | B63H 1/22 |

* cited by examiner

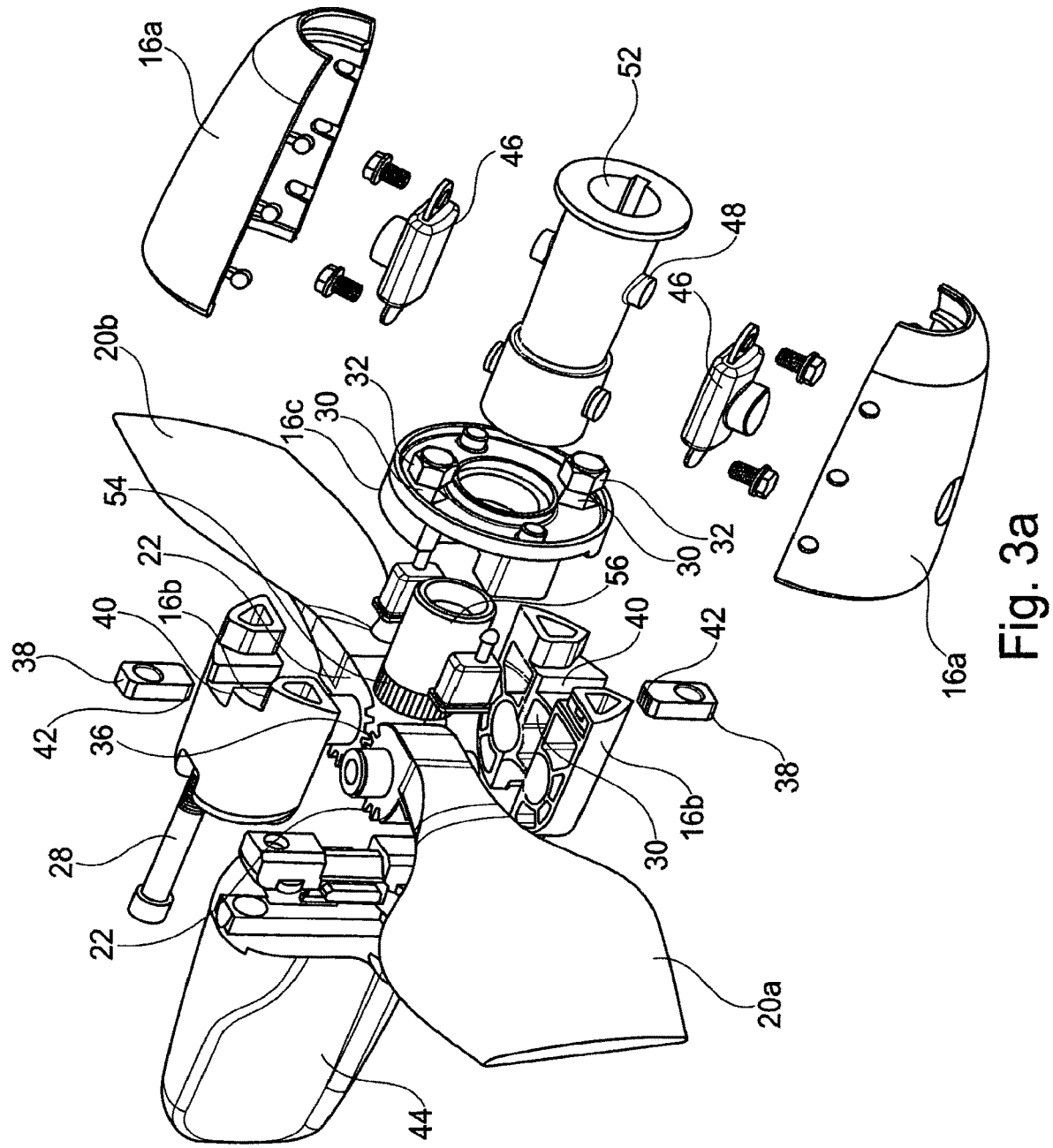

PROPELLER

The invention to which this application relates is to a propeller of the type, which is typically, although not necessary exclusively, for use in relation to vessels for use in water and, most typically, propellers of a type which can be moved between an in-use position in which the blades of the propeller extend outwardly to provide a propulsion force when rotated and, a storage position in which the desire is to minimise the effect of the blades as the vessel moves through the water and in which the blades are held substantially in line with the body of the propeller.

In yachting in particular, there is a constant aim to reduce the drag on the movement of the yacht through the water when using sails. The reduction in drag allows for an increase in speed and, particularly in yacht racing, any additional speed which can be gained gives a competitor a significant advantage. However, it is also necessary, in many yachts, for the same to be provided with propulsion means which allow the yacht to be moved through the water, even when there is no wind, or in other conditions where sails cannot be used safely. As a result, many yachts are fitted with an engine or motor which is connected to a propeller via a shaft so that the propeller typically is located below and towards the rear of the yacht hull. While the provision of the propeller has the advantage of allowing the yacht to be propelled through the water when it is in use, the blades of the propeller provide additional drag to the movement of the yacht when the sails are being used. It is known to attempt to mitigate this problem by providing the blades to be moveable with respect to the propeller body between an in use position in which the blades cause propulsion of the yacht through the water and a storage position in which the drag caused by the blades is significantly reduced.

While the use of propellers with movable blades so that they move outwardly under rotation under centrifugal force is known, there are significant problems with propellers of this type. A first problem is that the blades are typically fitted to the body in such a way that the blades are prone to become detached from the body during the lifetime of the propeller which can be difficult to identify and expensive to repair. This is typically due to the fact that the securing means for the blades are grub screws which can be prone to loosening, which, typically, is due to vibration. A further problem is with regard to the location of the propeller body on the shaft as, once again, vibration or the rotational movement of the propeller, can cause the loosening of the location means between the propeller body and the shaft. It is known that the propeller body can be secured by the provision of lock nuts but it is usually difficult to get spanners to where these can be adequately tightened up. Cross drilling can also be performed to allow the acceptance of cotter pins or securing wire or grub screws. Alternatively, tab washers can be provided such that, after tightening, the washer may be suitably deformed to minimise the chance of the propeller nut becoming lose. However, these solutions are often unsatisfactory in their performance.

A further problem is that the blades, even when moved to the storage position, can still cause significant drag and this can make the provision and use of the propellers unattractive to many sailors.

A yet further problem is that typically, the propeller is provided with a sacrificial metal or metal alloy, which is provided to corrode faster than the material from which the propeller itself is manufactured but it is found that commonly the contact with the sacrificial metal, is lost and therefore provides no benefit in preventing corrosion of the propeller itself. Conventionally, the anodes are located by a stainless steel screw on either the propeller body or around the propeller shaft. Typically, the anode corrodes where contact is supposed to be made to the protected body with the result that the reduction in electrical contact means that the effect of the anode is also much reduced.

The aim of the present invention is therefor to provide an improved propeller and, in particular to provide improvements which can be incorporated within a propeller in which the blades are moveable between first and second positions.

In a first aspect of the invention, there is provided a propeller, said propeller provided with location means to allow the same to be fitted to a drive shaft, a body in which the location means are provided, said body formed of at least first and second parts, and at least two blades, said blades being selectively moveable between a first, in-use position and a second, storage position and wherein the mechanical location means for the blades with the body, are substantially enclosed within the body once the body is formed, each said blade including a pin with a longitudinal axis about which said blade is moveable between said first and second positions and a series of teeth formed along an arc centred on said longitudinal axis, said teeth on said blades engage to allow the blades to be moved simultaneously between said positions and wherein the said blade, pin and teeth are provided as an integral unit.

Typically, the location means for the blade, includes a pin with a longitudinal axis, and said blade is moveable between said first and second positions, by pivotal movement about said longitudinal axis.

Typically, said location means include a series of teeth formed along an arc centred on the longitudinal axis of said pin and said teeth engage with teeth provided on the other blade so as to allow the blades to be moved simultaneously between the first and second positions such that a movement force exerted on one blade causes all of the blades to move simultaneously.

In one embodiment, the first position is that in which the blades are moved to extend substantially perpendicular to the longitudinal axis of the body and take up an in-use position so as to provide, when the propeller is rotated, a propulsion force for a vessel with which the same is fitted and the second position is a storage position in which the blades lie substantially parallel with the said longitudinal axis of the body.

Typically, the respective pins of each of the blades are placed in position in a part of the body while the said part is separated from the reminder of the body and, once the blade pins are placed into position, the respective parts of the body are joined together so as to form the body for the propeller.

Typically, the respective parts of the body are joined together by the provision of a series of securing bolts which pass long respective channels which have a longitudinal axis substantially parallel with the longitudinal axis of the propelled body once formed and into an annular disc which forms part of the body.

In one embodiment, at least one of the bolts have located thereon, intermediate the ends of the shafts of the same, an insert which is provided with teeth located within the body and said teeth are provided to engage with teeth formed on a cylinder which is located to be engaged with the shaft on which the propeller is mounted. The cylinder is provided with an internal thread to engage with a matching thread on the shaft and, on the external surface thereof, is provided with teeth which engage with the teeth of the insert. This means that when the teeth are engaged, rotation of the cylinder is prevented and hence loosening of the location between the cylinder and hence the propeller body and shaft is prevented and thereby maintains the shaft in location with the propeller body.

In one embodiment, the body includes a rear member which is formed and located so as to depend from the rear of the propeller body with respect to the direction of movement of the vessel, and is formed so as to lie in, and substantially fill, the space between the blades of the propeller when the same are in the storage position. This is found to reduce turbulence of the water between the blades when the same are in the storage position and hence reduce the drag caused by this turbulence.

In one embodiment, the propeller body includes at least one anode said anode mounted at a location intermediate the ends of the body.

In one embodiment the anode is cast from a suitable material, such as zinc or another suitable anode material, around a holder of a different material, such as aluminium bronze, or another alloy which is suitable for use, and compatible with, the material from which the propeller is made. Typically the holder is then securely bolted to the propeller body such that good electrical contact is maintained throughout the life of the anode.

Typically the propeller moves between the in-use and storage positions automatically in that it is the centrifugal force caused by the rotation of the shaft on which the propeller is mounted which causes the blades to open to the in-use position and it is the drag on the open blades, with no rotation of the shaft, that causes them to move to the storage position. The use of gearing between the two or more blades causes them to open and shut in unison.

In one embodiment there is provided an anode assembly, said anode assembly mounted to a body wherein said anode assembly includes an anode cast from a corrosive material around a holder of a different material which is compatible with the material from which the propeller is made, said holder mounted on the body.

Figure 1A:
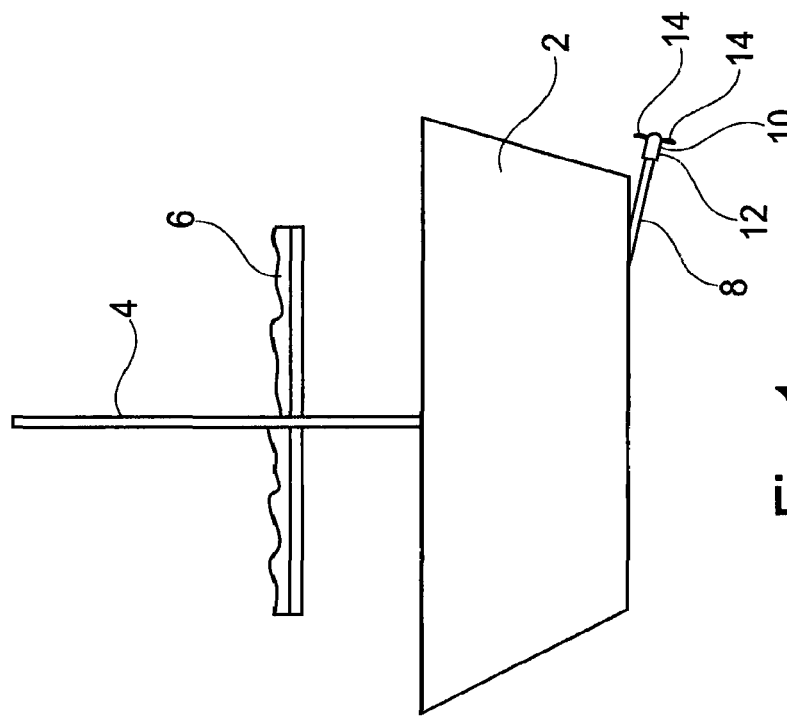

Specific embodiments of the invention are now described with reference to the accompanying drawings wherein;

FIGS. 1a and b illustrate in a schematic manner, the location of a propeller in accordance with one embodiment of the invention on a yacht with the propeller in an in-use position shown in FIG. 1a and a storage position shown in FIG. 1b.

Figure 2A:
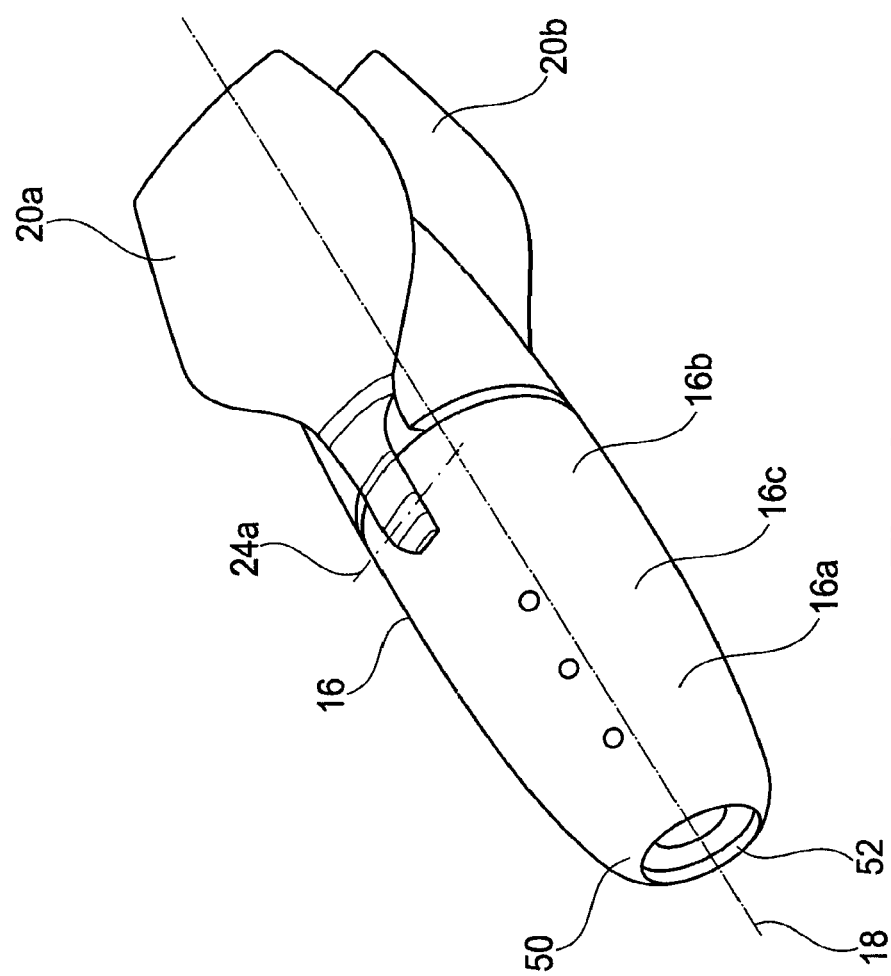
Figure 2B:
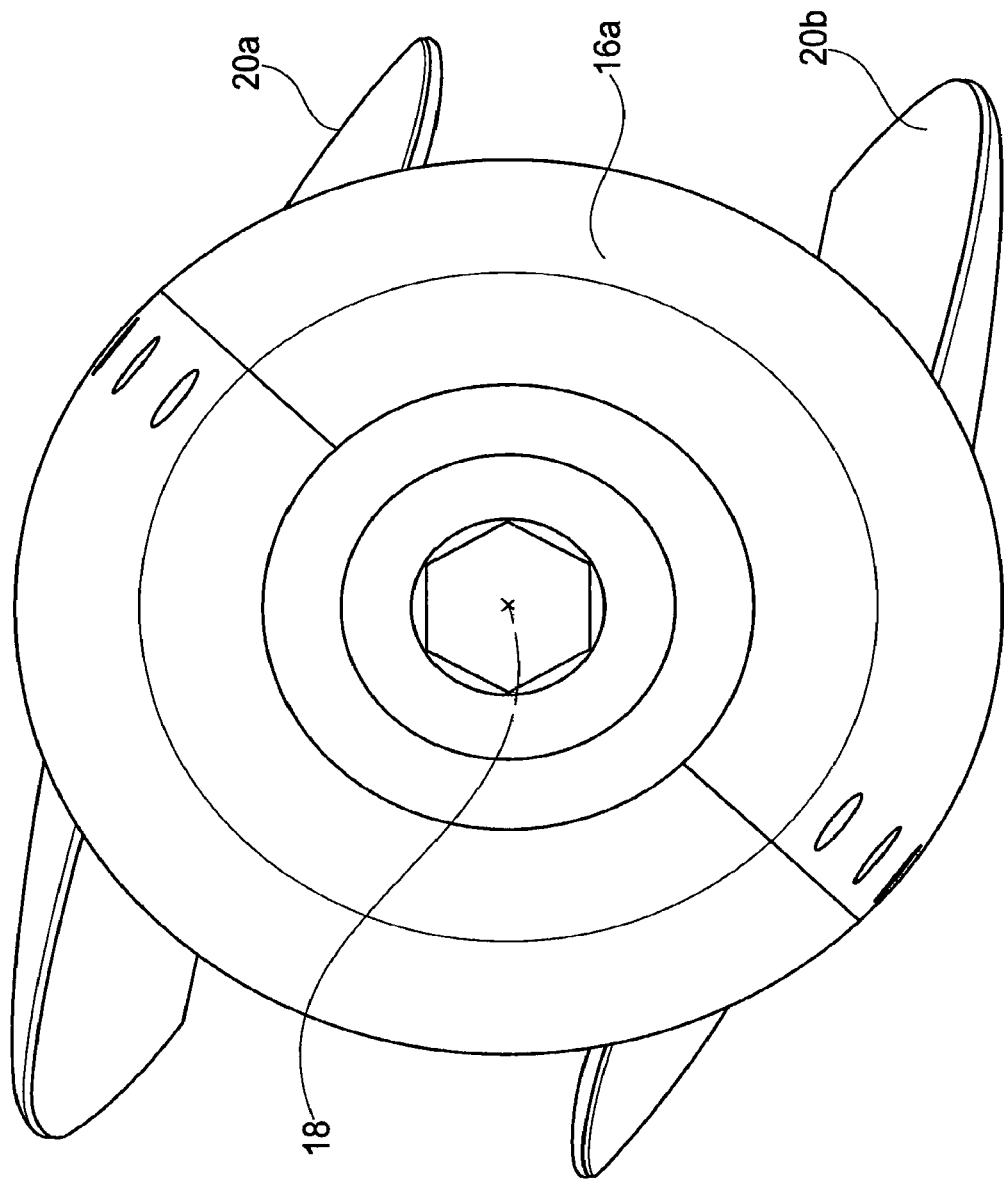
Figure 2C:
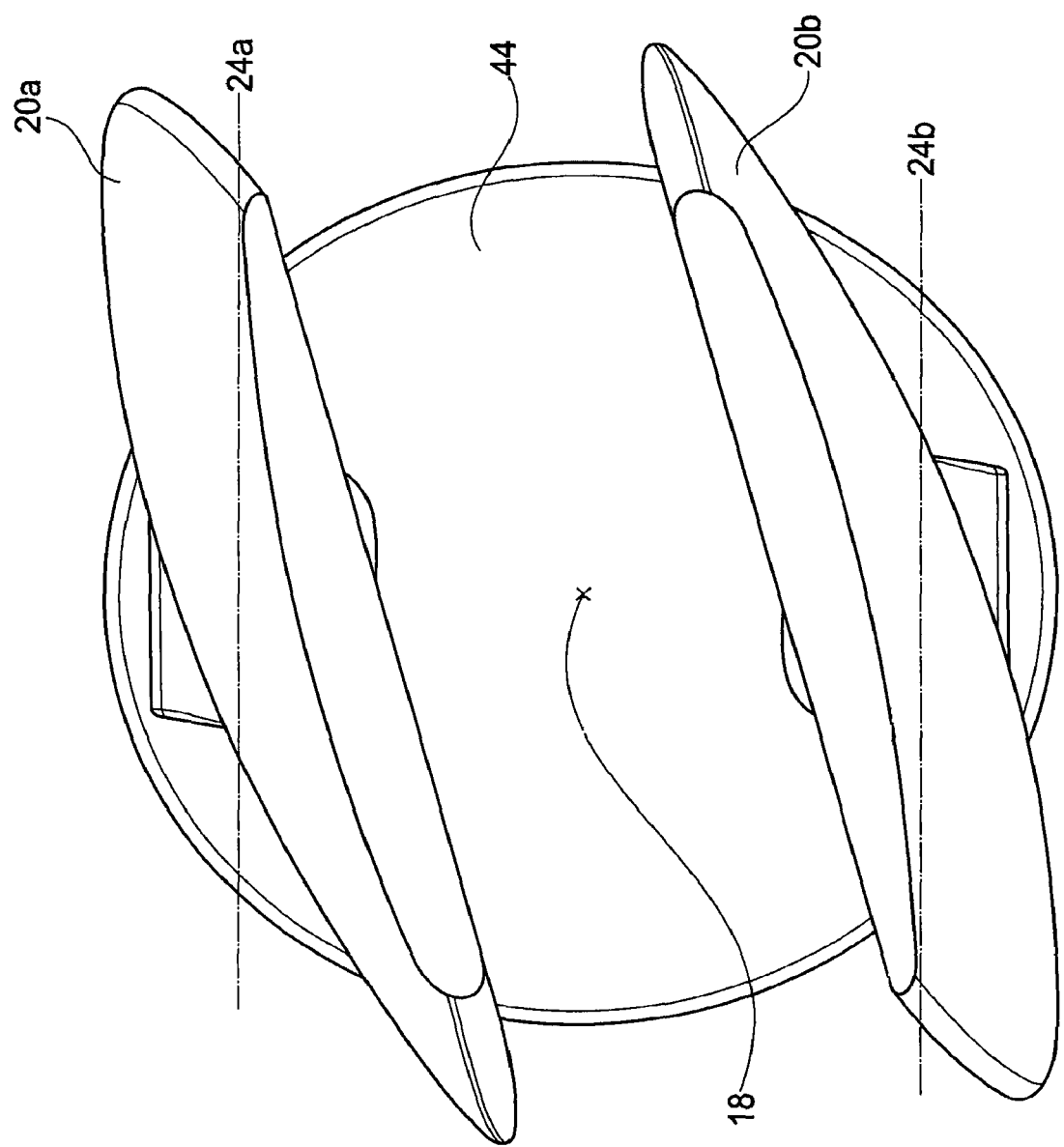
Figure 3B:
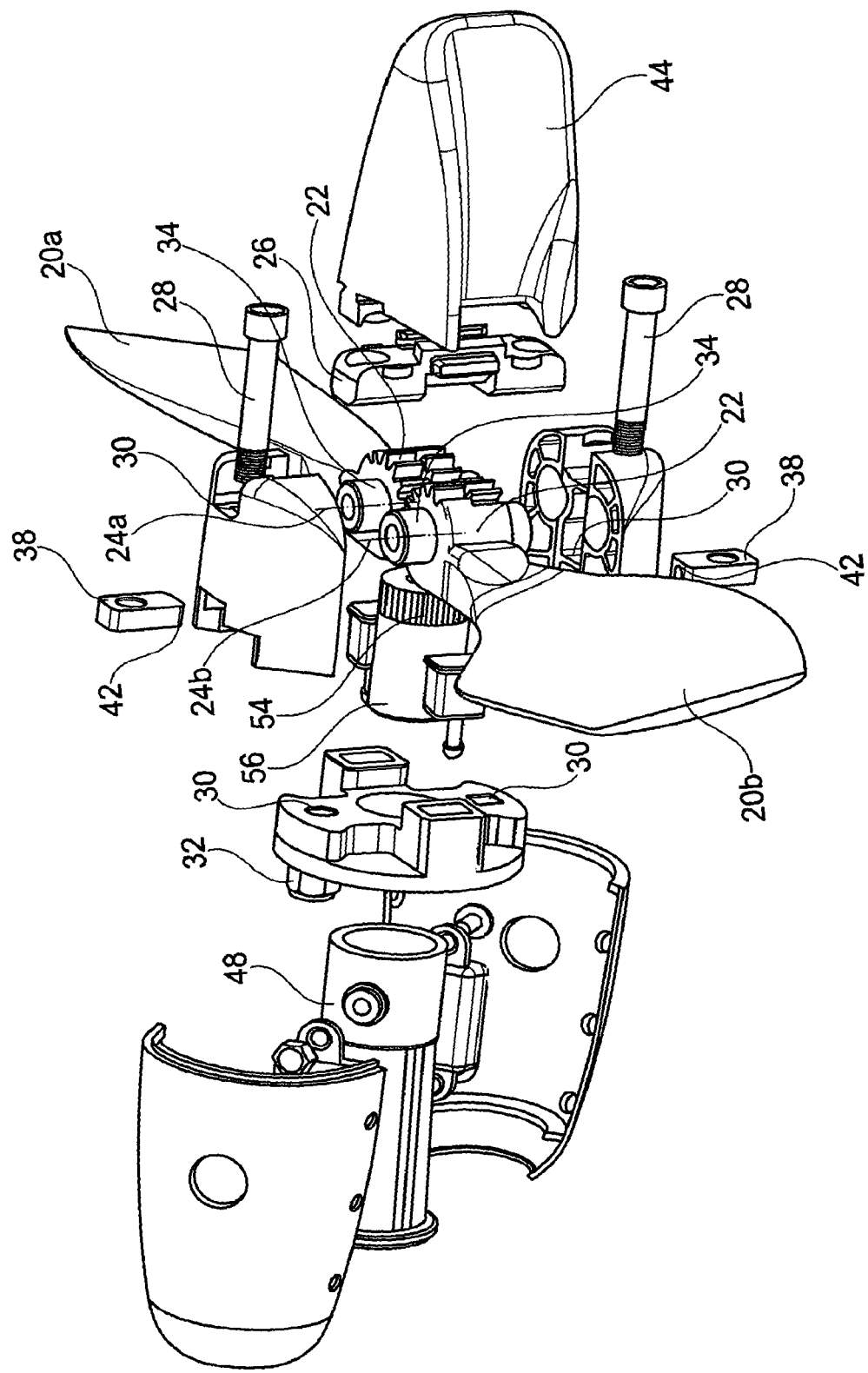
Figure 4B:
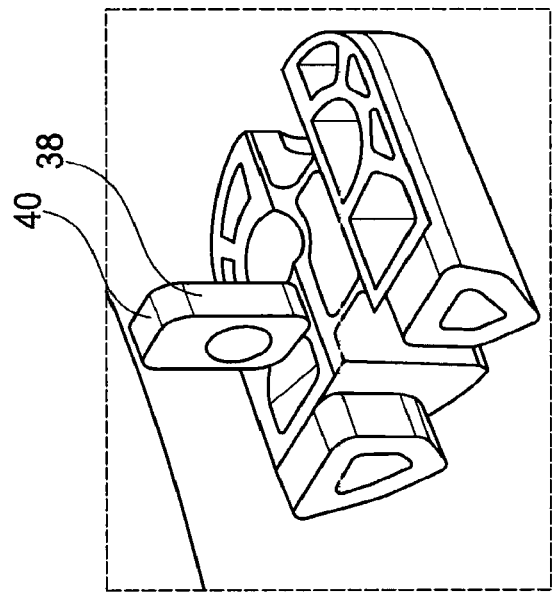
Figure 4A:
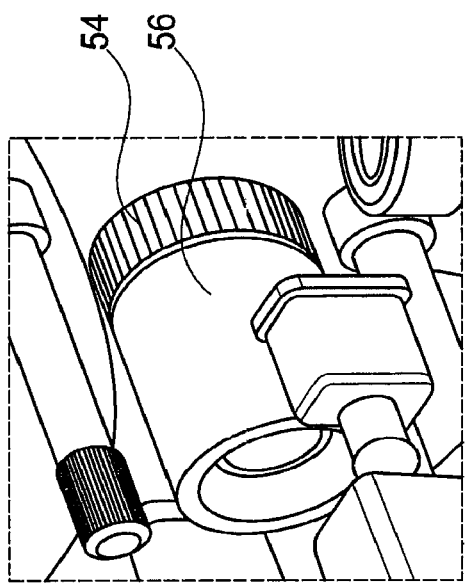
Figure 5:
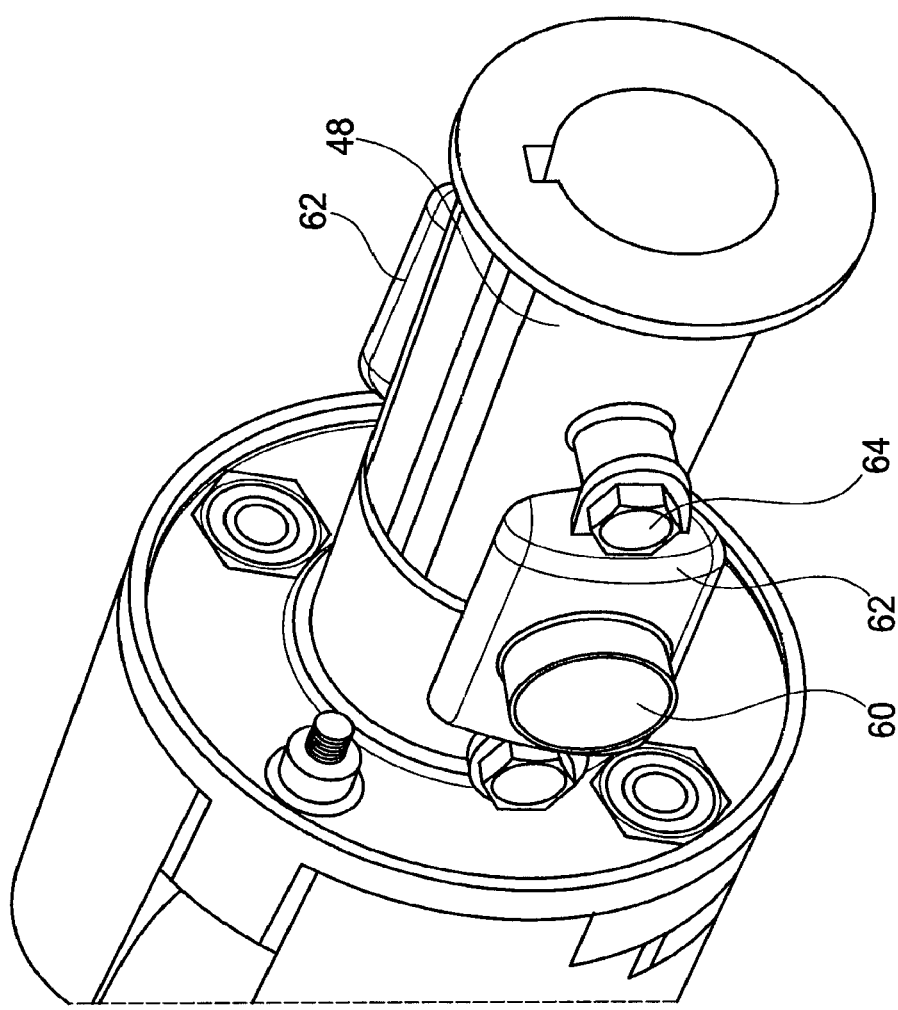

FIGS. 2a-c illustrate the propeller in the storage position in accordance with one embodiment of the invention;

FIGS. 3a-b are exploded diagrams showing the components of the propeller of FIGS. 2a-c with the blades shown in the in use position;

FIGS. 4a-b illustrates a shaft engagement assembly in accordance with one embodiment of the invention; and FIG. 5 illustrates an anode assembly according to one embodiment of the invention.

Referring firstly to FIGS. 1a and b, there is illustrated a vessel in the form of a yacht 2 with mast 4 and sails 6. The yacht is also provided with drive means in the form of an engine or motor (not shown) which is usually, but not in all cases, mounted within the hull of the vessel and, connecting from the motor or engine, is a shaft 8 which extends outwardly from the underside of the hull and, at the end of the shaft, there is provided a propeller 10 which has a body 12 and a series of blades 14. Instead of the shaft, other suitable means of transmitting the engine's power to the propeller may be provided.

In accordance with the invention, then, most typically, if the sails are not in use as shown in FIG. 1a, then there is a need to operate the propeller in order to move the vessel through the water and in this case, the blades of the propeller are moved to an in-use position as shown in FIG. 1a. However, when the sails are in use, as shown in FIG. 1b, there is a need to reduce the drag which is caused by the propeller blades on the movement of the vessel through the water and so the blades of the propeller are moved to a storage position as shown in FIG. 1b.

Referring now to FIGS. 2a-c, there is illustrated a propeller formed in accordance with one embodiment of the invention. The propeller incorporates a body 16 formed of front part 16a and rear part 16b and an intermediate annular disc 16c. The parts are joined together as shown, in order to form an elongate body with a longitudinal axis 18. The body supports and locates, blades 20a, 20b. The ends 22 of the respective blades, are located within the body and no securing components for the blades are accessible from externally of the body.

The blades can be moved between the storage position shown in FIGS. 2a-c and an in use position by pivotal movement about the respective axes 24a, 24b.

Turning now to FIGS. 3a and b the components of one embodiment of the propeller are now shown. In this case the blades are shown in the in-use position. As shown the respective body parts 16a and 16b each have portions which are brought together. In FIG. 3a, the two parts 16a are shrouds and may be formed from any suitable material. The main structural component are the parts 16c and the parts references 48 and 52 and although these are shown separate from part 16c, they will normally be manufactured as one piece. The portions of the rear part 16b are then attached to the annular disc 16c from the rear end 26 by a series of spaced apart bolts 28 which pass along channels 30 in the part 16b and annular disc 16c and into contact with locking bolts 32 so as to secure the body parts 16b and c together. This also acts to encapsulate the ends 22 of the blades within the body when formed. As shown the end of each blade has a pin 34 so located such as to mechanically locate the blades within the body and also define the axis of rotation 24a, b of the blade with respect to the body. The pin 34 may be free to turn within the blade component, or may be driven into the blade component by use of an interference fit or may be held in position by the action of the blade being cast around it or may be formed as a unitary casting which is integral with the blade.

The pivot pins 34 of the blades 20a, 20b in one embodiment are held captive by the blades by the action of casting the metal for the blades around the pins themselves. This means that the pins cannot escape from the blades and therefore cannot come loose and be potentially lost and which, in turn, would cause the blade to be lost from the propeller.

The end also includes a series of teeth 36 such that the teeth on the respective blade ends mesh and so the application of force to cause one blade to be moved between in use and storage positions will also cause the movement of the other blade simultaneously.

Also located on the shaft of the bolts 28, are an insert 38, each of which are located within an aperture 40 in the body part 16b so as to be substantially in line with the external surface of the same and to depend inwardly therefrom. The inserts are free to rotate within their aperture and around restraining bolts by as great a degree as is needed for them always to engage with one suitable set of teeth on the retaining nut. The inserts 42 have teeth formed thereon on the inner face for the reasons which will be discussed further subsequently.

Also provided as part of the body, is a rear member 44 which is located so as to lie within the spaced defined between the blades 20a, 20b when the same are moved to the second, storage position shown in FIGS. 2a-c. This therefore reduces the turbulence in the space between the blades as the same is now filled by the rear member. The rear member 44 therefore reduces drag by minimising the extent of vortex generated by the movement of the propeller through the water which, in turn, reduces the resistance of the propeller as it moves through the water. The drag reducer also serves to prevent access to the heads of the bolts 28 unless it is forcibly removed for service and thereby also ensures the inability of the bolts 28 to escape and so in addition to reducing drag, the rear member 44 also serves to maintain the integrity of the propeller during it's use and retain the same on the drive shaft.

The body also includes one or more anodes 46 which are formed of a sacrificial metal and which are provided to corrode faster than the material from which the propeller itself is formed and therefore the anodes can be replaced as and when required. These are secured to the front drive shaft fixing boss 48 which is used to provide a keyed fixing with the drive shaft 8 which extends from the front 50 of the body through aperture 52.

The teeth 40 of the inserts 38 are provided to engage with a series of teeth 54 formed on the external surface of a rear shaft fixing cylinder 56. The cylinder is provided with an internal face which is threaded at least partially and which is provided to engage and secure the shaft in respect to the propeller. Once the cylinder is engaged with the shaft then the inserts can be moved into position such that the teeth 40 of the inserts 38 are engaged with the teeth 54 of the cylinder and, as the inserts are then trapped in position within the body of the propeller so rotational movement of the cylinder or nut 56 is prevented and so loosening of the engagement between the shaft and the propeller body is also prevented.

FIG. 4a illustrates the rear fixing cylinder or nut 56 with the series of teeth 54 formed on the external surface at one end thereof. FIG. 4b illustrates an insert 38 with teeth 40 to engage the teeth 54 on the fixing cylinder or nut 56. The insert 38 is provided with a geometry such that it can swivel on its mounting shaft to a sufficient amount, typically the width between successive teeth, so as to ensure that the teeth 40 of the insert can always move to a sufficient extent to engage with the teeth 54 of the rear fixing cylinder or nut. This engagement of the teeth 40 and teeth 54 means that the fixing cylinder or nut 56 cannot come undone in use of the propeller thereby eliminating the need for the use of cross drilling or the use of lock nuts or tab washers to secure the same in position. This therefore means that the integrity of the propeller is maintained during the use of the same.

FIG. 5 illustrates anode assemblies each of which, in this case, include an anode 60 made by casting zinc or another suitable alloy for the water in which the vessel is likely to operate, around a holder of aluminium bronze, or alloy suitable for use and compatible with the propeller body material. The holder 62 is then securely bolted to the propeller boss 48 via bolt 64 so that good electrical contact is maintained between the anode and the propeller body throughout the life of the anode. The provision of the anode 60 in the form in which the same is cast around a holder 62 which is securely bolted to the shaft housing 48 ensures that a continuous good electrical contact between the propeller body and the anode during the life of the anode is maintained. This is contrary to conventional arrangements in which the anode the anode is normally bolted on and the contact, and hence performance of the anode deteriorates with use.

The present invention therefore provides a propeller which can be moved between storage and in use positions and which can be used in a manner which allows the long term life and reliability of the propeller to be improved in comparison to conventional propellers of this type. As a result there is provided a propeller design in which the propeller securing nut cannot come loose and the blades cannot be shed. Thus the provision of the anode assembly means that the anti-corrosion anodes make better electrical contact through the life of the anode and so the life of the propeller body and components can be maintained.

The design of the propeller as detailed herein means that unstressed material has been removed so that the weight of the propeller and the force exerted on the appropriate bearings is reduced and the vortex-generating space behind the blades, when in the storage position is substantially filled such that the vortex drag is minimised.

The invention claimed is:

1. A propeller, said propeller provided with location means to allow the same to be fitted to a drive shaft, a body in which the location means are provided, said body formed of at least first and second parts, and at least two blades, said blades being selectively moveable between a first, in-use position and a second, storage position and wherein the mechanical location means for the blades with the body, are substantially enclosed within the body once the body is formed, each said blade including a pin with a longitudinal axis about which said blade is moveable between said first and second positions and a series of teeth formed along an arc centered on said longitudinal axis, said teeth on said blades engage to allow the blades to be moved simultaneously between said positions and wherein the said blade, pin and teeth are provided as an integral unit, the respective pins of each of the blades are placed in position in a part of the body while said part is separated from the remainder of the body and, once the pins are placed into position, the respective at least first and second parts are joined together so as to form the body of the propeller by the provision of a series of securing bolts which pass along respective channels, at least one of the bolts have located thereon, intermediate the ends, an insert which is provided with teeth and which is located within the body and said teeth are provided to engage with teeth formed on a cylinder which is located to be engaged with the shaft on which the propeller is mounted.

2. A propeller according to claim 1 wherein said teeth engage with teeth provided on the second blade so as to allow the blades to be moved simultaneously between the first and second positions.

3. A propeller according to claim 2 wherein a movement force exerted on one blade causes all of the blades to move simultaneously.

4. A propeller according to claim 1 wherein in the first, in use, position the blades are positioned to provide, when the propeller is rotated, a propulsion force for a vessel to which the propeller is fitted.

5. A propeller according to claim 1 wherein in the first, in use, position, the blades extend substantially perpendicular to the longitudinal axis of the body.

6. A propeller according to claim 1 wherein when the blades are in the second, storage, position the blades lie substantially parallel with the said longitudinal axis of the body.

7. A propeller according to claim 1 wherein the said channels have a longitudinal axis which is substantially parallel with the longitudinal axis of the propeller body once formed.

8. A propeller according to claim 1 wherein the channels are provided to allow the bolts to pass into an annular disc which forms part of the body.

9. A propeller according to claim 1 wherein the cylinder is provided with an internal thread to engage with a matching thread on the shaft and, on the external surface thereof, is provided with teeth which engage with the teeth of the insert.

10. A propeller according to claim 1 wherein when the teeth are engaged, rotation of the cylinder is prevented and hence loosening of the location between the cylinder and hence the propeller body and shaft is prevented and thereby maintains the shaft in location with the propeller body.

11. A propeller according to claim 1 wherein the propeller includes a rear member which is formed and located so as to depend from the rear of the body with respect to the forward direction of movement created by the rotation of the blades of the propeller.

12. A propeller according to claim 11 wherein the said rear member substantially fills the space between the blades of the propeller when the same are in the second, storage position.

13. A propeller according to claim 1 wherein the propeller body includes at least one anode mounted at a location intermediate the ends of the body.

14. A propeller according to claim 1 wherein the anode is cast of a first material, on a holder of a second, different, material to the first and which second material is suitable for use, and compatible with, the material from which the propeller body is made.

15. A propeller according to claim 14 wherein the holder is connected to the propeller body to make electrical contact between the body and the anode.

16. A propeller according to claim 1 wherein the propeller moves between the first, in-use and/or second, storage positions under the influence of forces caused by the rotation or non-rotation of the body via a shaft on which the propeller is mounted.

17. A propeller according to claim 16 wherein rotation of the body causes the blades to move apart to the in-use position as a result of the centrifugal force created.

18. A propeller according to claim 16 wherein drag on the blades when in the first, in-use position, with no rotation of the body causes the blades to move to the storage position.

* * * * *